(12) United States Patent
Eisaman

(10) Patent No.: US 9,862,643 B2
(45) Date of Patent: Jan. 9, 2018

(54) BUILDING MATERIALS FROM AN AQUEOUS SOLUTION

(71) Applicant: X Development LLC, Mountain View, CA (US)

(72) Inventor: Matthew D. Eisaman, Port Jefferson, NY (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/165,260

(22) Filed: May 26, 2016

(65) Prior Publication Data

US 2017/0341982 A1 Nov. 30, 2017

(51) Int. Cl.

| C04B 28/06 | (2006.01) |
|---|---|
| B01D 61/42 | (2006.01) |
| C02F 1/52 | (2006.01) |
| C02F 1/469 | (2006.01) |
| C04B 28/02 | (2006.01) |
| C04B 28/04 | (2006.01) |
| C04B 14/28 | (2006.01) |
| C04B 14/36 | (2006.01) |
| C02F 101/10 | (2006.01) |
| C02F 103/08 | (2006.01) |

(52) U.S. Cl.
CPC ............ *C04B 28/06* (2013.01); *B01D 61/422* (2013.01); *C02F 1/4693* (2013.01); *C02F 1/52* (2013.01); *C04B 14/28* (2013.01); *C04B 14/36* (2013.01); *C04B 28/021* (2013.01); *C04B 28/04* (2013.01); *C02F 2101/10* (2013.01); *C02F 2103/08* (2013.01)

(58) Field of Classification Search
CPC ....... C04B 28/06; C04B 28/04; C04B 28/021; C04B 14/28; C04B 14/36; B01D 61/422; C02F 1/52; C02F 1/4693; C02F 2101/10; C02F 2103/08
See application file for complete search history.

(56) References Cited

U.S. PATENT DOCUMENTS

| 3,075,828 A | 1/1963 | Kato et al. |
|---|---|---|
| 4,036,749 A | 7/1977 | Anderson |
| 4,392,959 A | 7/1983 | Coillet |
| 5,240,579 A | 8/1993 | Kedem |
| 6,905,606 B1 | 6/2005 | Kikuyama et al. |
| 7,117,106 B2 | 10/2006 | Rusta-Sallehy et al. |
| 7,198,722 B2 | 4/2007 | Hussain |
| 7,655,193 B1 | 2/2010 | Rau et al. |
| 7,700,214 B1 | 4/2010 | Iyer et al. |
| 7,906,028 B2 | 3/2011 | Constantz et al. |
| 7,931,809 B2 | 4/2011 | Constantz et al. |
| 7,947,239 B2 | 5/2011 | Lackner et al. |
| 7,966,250 B2 | 6/2011 | Constantz |
| 8,227,127 B2 | 7/2012 | Little et al. |
| 8,313,557 B2 | 11/2012 | Willauer et al. |
| 8,337,589 B2 | 12/2012 | Wright et al. |
| 8,685,250 B2 | 4/2014 | Choi et al. |
| 8,778,156 B2 | 7/2014 | Eisaman et al. |
| 8,784,632 B2 | 7/2014 | Eisaman et al. |
| 8,999,171 B2 | 4/2015 | Wallace |
| 9,227,168 B1 | 1/2016 | DeVaul et al. |
| 2005/0074657 A1 | 4/2005 | Rusta-Sallehy et al. |
| 2008/0033338 A1 | 2/2008 | Smith |
| 2008/0093307 A1 | 4/2008 | Somers et al. |
| 2009/0001020 A1 | 1/2009 | Constantz et al. |
| 2010/0028242 A1 | 2/2010 | Willauer et al. |
| 2010/0233767 A1 | 9/2010 | McMurran |
| 2010/0288700 A1 | 11/2010 | Lahav et al. |
| 2011/0056876 A1 | 3/2011 | Ide et al. |
| 2011/0135551 A1 | 6/2011 | House et al. |
| 2011/0177550 A1 | 7/2011 | McMurran |
| 2011/0224578 A1 | 9/2011 | Edman et al. |
| 2011/0226006 A1 | 9/2011 | Lackner et al. |
| 2011/0237839 A1 | 9/2011 | Waldstein |
| 2011/0281959 A1 | 11/2011 | DiMascio et al. |
| 2012/0211421 A1 | 8/2012 | Self et al. |
| 2012/0220019 A1 | 8/2012 | Lackner |
| 2012/0244053 A1 | 9/2012 | Self et al. |
| 2013/0008792 A1 | 1/2013 | Eisaman et al. |
| 2013/0034760 A1 | 2/2013 | Otts et al. |
| 2013/0206605 A1 | 8/2013 | DiMascio et al. |
| 2013/0281553 A1 | 10/2013 | Kubic et al. |
| 2013/0343981 A1 | 12/2013 | Wright et al. |
| 2014/0002788 A1 | 1/2014 | Otts et al. |
| 2014/0217024 A1 | 8/2014 | Monzyk et al. |
| 2014/0234735 A1 | 8/2014 | Zhang et al. |
| 2014/0238869 A1 | 8/2014 | DiMascio et al. |
| 2014/0272639 A1 | 9/2014 | Zietlow |
| 2014/0303452 A1 | 10/2014 | Ghaffari |
| 2014/0322803 A1 | 10/2014 | Constantz et al. |
| 2014/0338903 A1 | 11/2014 | Mahmoud et al. |
| 2015/0274536 A1 | 10/2015 | Wright et al. |
| 2015/0298806 A1 | 10/2015 | Lind et al. |
| 2016/0082387 A1 | 3/2016 | Constantz et al. |

FOREIGN PATENT DOCUMENTS

| CN | 102936067 A | 2/2013 |
|---|---|---|
| EP | 1276795 | 3/2006 |

(Continued)

OTHER PUBLICATIONS

Eisaman M. D. et al., CO2 separation using bipolar membrane electrodialysis, Energy & Environmental Science, Apr. 2011, 10 pages.
U.S. Appl. No. 14/971,122—Electrodialytic CO2 Purification and Stripping, filed Dec. 16, 2015, 16 pages.
U.S. Appl. No. 14/736,847—Energy Efficient Method for Stripping CO2 From Seawater, filed Jun. 11, 2015, 16 pages.
U.S. Appl. No. 14/750,800—CO2 Sequestration via Desalination, filed Jun. 25, 2015, 16 pages.

(Continued)

*Primary Examiner* — Anthony J Green
(74) *Attorney, Agent, or Firm* — Christensen O'Connor Johnson Kindness PLLC

(57) ABSTRACT

A method of making building materials from an aqueous solution includes receiving the aqueous solution with dissolved ions and increasing a pH of the aqueous solution so the dissolved ions precipitate from the aqueous solution as salt. The method also includes collecting the salt precipitated from the aqueous solution and forming the building materials from the salt.

15 Claims, 5 Drawing Sheets

(56) References Cited

FOREIGN PATENT DOCUMENTS

| EP | 2074066 | 7/2009 |
|---|---|---|
| EP | 2236477 A1 | 10/2010 |
| EP | 2465600 | 6/2012 |
| EP | 2465601 | 6/2012 |
| EP | 2543427 | 1/2013 |
| WO | WO 9412465 | 6/1994 |
| WO | WO 2010/142943 A2 | 12/2010 |
| WO | WO 2011/090376 A1 | 7/2011 |
| WO | WO 2012050530 A1 | 4/2012 |

OTHER PUBLICATIONS

International Search Report and Written Opinion from the International Searching Authority dated Aug. 21, 2017, for International Application No. PCT/US2017/031518, filed May 8, 2017, 17 pages.

Willauer, H. D. et al., Extraction of Carbon Dioxide from Seawater by an Electrochemical Acidification Cell. Part 2—Laboratory Scaling Studies, Apr. 2011, 22 pages.

Eisaman M. D. et al., $CO_2$ extraction from seawater using bipolar membrane electrodialysis, May 2012, 8 pages.

Biorock International Coral Reef Restoration, Biorock International Corporation, 2012, 2 pages.

Rangel C. M. et al., Integrating hydrogen generation and storage in a novel compact electrochemical system based on metal hydrides, Jul. 2008, 5 pages.

U.S. Appl. No. 62/342,061—Method for Efficient $CO_2$ Degasification, filed May 26, 2016, 23 pages.

U.S. Appl. No. 15/165,867—Method for Feeding Algae Using Reclaimed $CO_2$, filed May 26, 2016, 19 pages.

U.S. Appl. No. 15/165,885—Metal Hydride Electrolysis System, filed May 26, 2016, 21 pages.

U.S. Appl. No. 62/342,065—Chemical Extraction From an Aqueous Solution, filed May 26, 2016, 29 pages.

U.S. Appl. No. 15/165,205—Chemical Extraction From an Aqueous Solution and Power Generator Cooling, filed May 26, 2016, 30 pages.

U.S. Appl. No. 15/165,311—Enhanced Hydrocarbon Extraction, filed May 26, 2016, 27 pages.

U.S. Appl. No. 15/165,357—Fuel Synthesis From an Aqueous Solution, filed May 26, 2016, 31 pages.

BUILDING MATERIALS FROM AN AQUEOUS SOLUTION

TECHNICAL FIELD

This disclosure relates generally to fabrication of building materials.

BACKGROUND INFORMATION

Carbon dioxide ($CO_2$) may be harmful to the earth's atmosphere in large quantities. The separation of $CO_2$ from a mixed-gas source (such as the atmosphere) may be accomplished by a capture and regeneration process. The process generally includes a selective capture of $CO_2$, accomplished by, for example, contacting a mixed-gas source with a solid or liquid adsorber/absorber followed by a generation or desorption of $CO_2$ from the adsorber/absorber. One technique describes the use of bipolar membrane electrodialysis for $CO_2$ extraction/removal from potassium carbonate and bicarbonate solutions.

For capture/regeneration systems, a total volume of mixed-gas source that must be processed is generally inversely related to a concentration of $CO_2$ in the mixed-gas source, adding significant challenges to the separation of $CO_2$ from dilute sources such as the atmosphere. $CO_2$ in the atmosphere, however, establishes equilibrium with the total dissolved inorganic carbon in the oceans, which is largely in the form of bicarbonate ions ($HCO_{3-}$) at an ocean pH of 8.1-8.3. Therefore, a method for extracting $CO_2$ from the dissolved inorganic carbon of the oceans would effectively enable the separation of $CO_2$ from atmosphere without the need to process large volumes of air.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method for making building materials from an aqueous solution are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout the specification and claims, compounds/elements are referred to both by their chemical name (e.g., carbon dioxide) and chemical symbol (e.g., $CO_2$). It is appreciated that both chemical names and symbols may be used interchangeably and have the same meaning.

This disclosure provides for the removal of carbon from water sources containing dissolved inorganic carbon (e.g., bicarbonate ions $HCO_3^-$), and forming building materials from the dissolved ions. The world's oceans act as carbon sinks absorbing large quantities of atmospheric carbon. As will be shown, systems and methods in accordance with the teachings of the present disclosure may be used to remove bicarbonate and carbonate ($CO_3^{(2-)}$) ions from the water and convert the ions into building materials (including limestone-bricks and cement). Removing excess carbon from the oceans may be both lucrative and environmentally restorative.

Figure 1A:
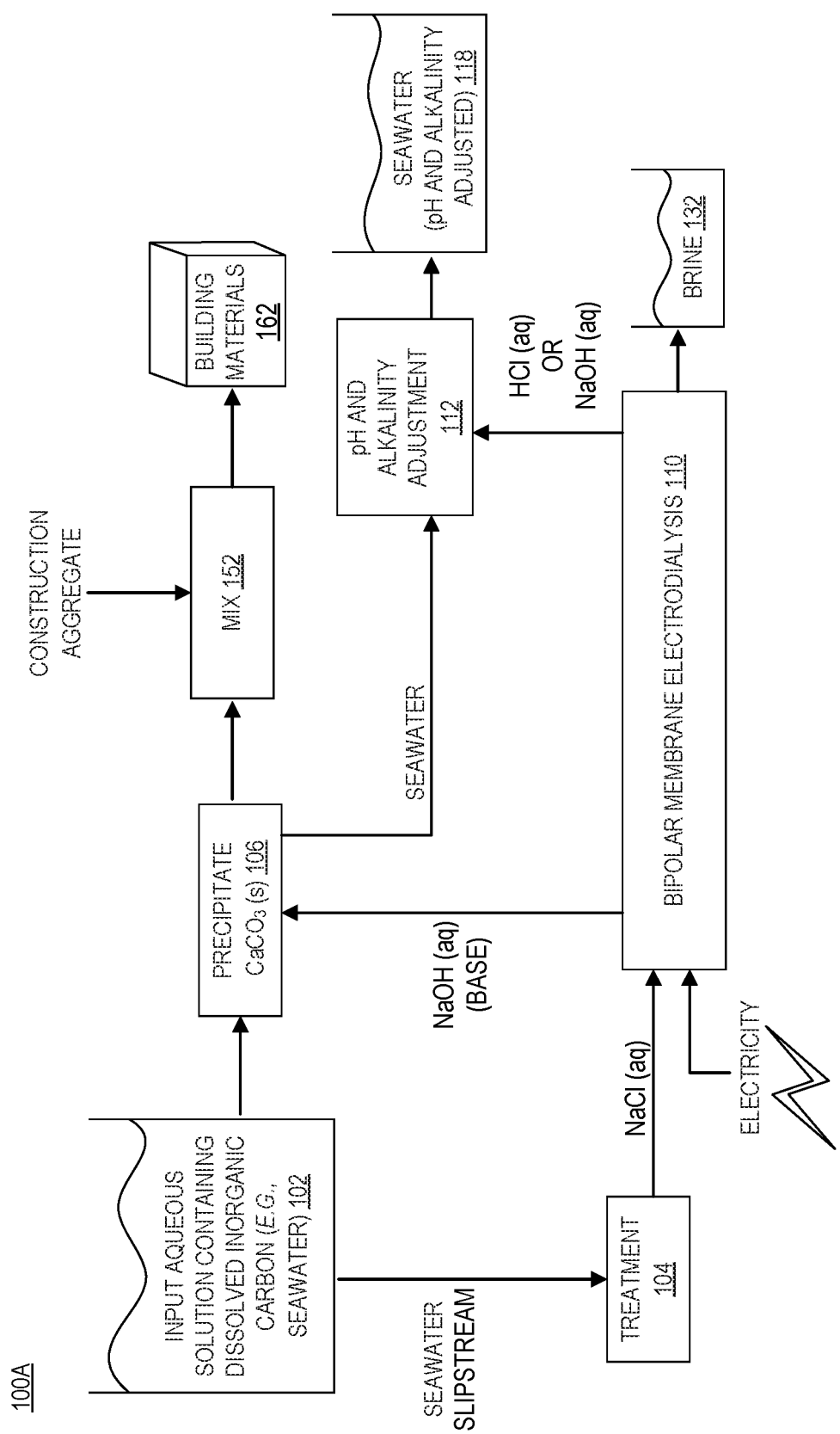
FIG. 1A is an illustration of a system for making building materials from an aqueous solution, in accordance with an embodiment of the disclosure.

FIG. 1A is an illustration of system 100A for making building materials from an aqueous solution, in accordance with an embodiment of the disclosure. System 100A includes: input 102 (to input an aqueous solution containing dissolved inorganic carbon), treatment unit 104, first precipitation unit 106, electrodialysis unit 110, pH and alkalinity adjustment unit 112, water output 118, brine output 132, mixing unit 152, and building material output 162.

As shown, input 102 is coupled to a water reservoir containing dissolved inorganic carbon (e.g., bicarbonate ions). The water reservoir may be an ocean, lake, river, manmade reservoir, or brine outflow from a reverse osmosis ("RO") process. Input 102 may receive the water through a system of channels, pipes, and/or pumps depending on the specific design of the facility. As shown, water received through input 102 is diverted into two separate sections of system 100A. A first (smaller) portion of the water is diverted to treatment unit 104, while a second (larger) portion of the water is diverted to first precipitation unit 106. One skilled in the art will appreciate that large aggregate may be removed from the water at any time during the intake process.

In the illustrated embodiment, the first portion of water is diverted into treatment unit 104. Treatment unit 104 outputs a relatively pure stream of aqueous NaCl. In other words, an aqueous solution (possibly including seawater) is input to treatment unit 104, and aqueous NaCl is output from treatment unit 104. Treatment unit 104 may be used to remove organic compounds and other minerals (other than NaCl) not needed in, or harmful to, subsequent processing steps. For example, removal of chemicals in the water may mitigate scale buildup in electrodialysis unit 110. Treatment unit 104 may include filtering systems such as: nanofilters, RO units, ion exchange resins, precipitation units, microfilters, screen filters, disk filters, media filters, sand filters, cloth filters, and biological filters (such as algae scrubbers), or the like.

Additionally, treatment unit 104 may include chemical filters to removed dissolved minerals/ions. One skilled in the art will appreciate that any number of screening and/or filtering methods may be used by treatment unit 104 to remove materials, chemicals, aggregate, biologicals, or the like.

Electrodialysis unit 110 is coupled to receive aqueous NaCl and electricity, and output aqueous HCl, aqueous NaOH, and brine (to brine output 132). Aqueous HCl and aqueous NaOH output from electrodialysis unit 110 may be used to drive chemical reactions in system 100A. The specific design and internal geometry of electrodialysis unit 110 is discussed in greater detail in connection with FIG. 2 (see infra FIG. 2). Brine output from electrodialysis unit 110 may be used in any applicable portion of system 100A. For example, brine may be cycled back into electrodialysis unit 110 as a source of aqueous NaCl, or may be simply expelled from system 100A as wastewater.

In the illustrated embodiment, first precipitation unit 106 has a first input coupled to receive an aqueous solution including dissolved inorganic carbon (e.g., seawater) from input 102. First precipitation unit 106 also has a second input coupled to electrodialysis unit 110 to receive aqueous NaOH. In response to receiving the aqueous solution and the aqueous NaOH, first precipitation unit 106 precipitates calcium salts (for example, but not limited to, $CaCO_3$) and outputs the aqueous solution. However, in other embodiments, other chemical processes may be used to basify the aqueous solution in first precipitation unit 106. For example, other bases (not derived from the input aqueous solution) may be added to the aqueous solution to precipitate calcium salts.

In one embodiment, NaOH is added to incoming seawater until the pH is sufficiently high to allow precipitation of calcium salts without significant precipitation of $Mg(OH)_2$. The exact pH when precipitation of $CaCO_3$ occurs (without significant precipitation of $Mg(OH)_2$) will depend on the properties of the incoming seawater (alkalinity, temperature, composition, etc.); however, a pH of 9.3 is typical of seawater at a temperature of 25° C. In a different embodiment, the quantity of NaOH added is sufficient to precipitate $CaCO_3$ and $Mg(OH)_2$, which can be used together to form building materials.

In one embodiment, first precipitation unit 106 may be a large vat or tank. In other embodiments first precipitation unit 106 may include a series of ponds/pools. In this embodiment, precipitation of calcium salts may occur via evaporation driven concentration (for example using solar ponds) rather than, or in combination with, adding basic substances. First precipitation unit 106 may contain internal structures with a high surface area to promote nucleation of $CaCO_3$; these high surface area structures may be removed from the first precipitation unit 106 to collect nucleated $CaCO_3$. First precipitation unit 106 may include an interior with $CaCO_3$ to increase nucleation kinetics by supplying seed crystals. The bottom of first precipitation unit 106 may be designed to continually collect and extract precipitate to prevent large quantities of scale buildup.

In another or the same embodiment, heat may be used to aid precipitation. For example solar ponds may be used to heat basified water. In continuously flowing systems, low temperature waste heat solution may be flowed through heat exchange tubes with basified seawater on the outside of the tubes. Alternatively, heating the bottom of first precipitation unit 106 may be used to speed up precipitation.

After $CaCO_3$ is precipitated from the water, $CaCO_3$ is transferred to mixing unit 152. Mixing unit 152 may combine the precipitated $CaCO_3$ with construction aggregate such as sand, gravel, rocks, pebbles, or the like. Mixing unit 152 may also include processing or compression equipment to form bricks or other large structures from the $CaCO_3$. Bricks of limestone ($CaCO_3$) may be cubic or may take any other useful shape. Building materials output from mixing unit 152 may be used to form breakwaters, harbors, buildings, or the like. System 100A may be especially useful in places with limited terrestrial resource, such as low-lying islands. However, in other embodiments, the $CaCO_3$ may be used directly after removal from first precipitation unit 106 (without being formed into larger structures). For example, $CaCO_3$ removed from first precipitation unit 106 may be used for road bases. Additionally, as will be discussed in greater detail in connection with FIG. 1B, $CaCO_3$ may be heated with other materials to form cement or mortar.

In the depicted embodiment, the second portion of seawater (that was used as a carbon source in first precipitation unit 106) is flowed to a pH and alkalinity adjustment unit 112. The pH and alkalinity adjustment unit 112 is coupled to electrodialysis unit 110 to receive HCl and NaOH, and adjust a pH and alkalinity of the combined second portion of the aqueous solution and basic solution to a pH of seawater (or other environmentally safe pH value). In one embodiment, the pH and alkalinity of wastewater flowed into pH and alkalinity adjustment unit 112 is monitored in real time, and HCl or NaOH is flowed into pH and alkalinity adjustment unit 112 in response to the real time measurements. Adjusting the pH of wastewater flowing from system 100A ensures minimal environmental impact of running system 100A, while adjusting the alkalinity ensures sufficient reabsorption of atmospheric $CO_2$ once the water is returned to the ocean. Further, system 100A removes carbon from the oceans, improving ocean heath while producing economically viable building materials.

Figure 1B:
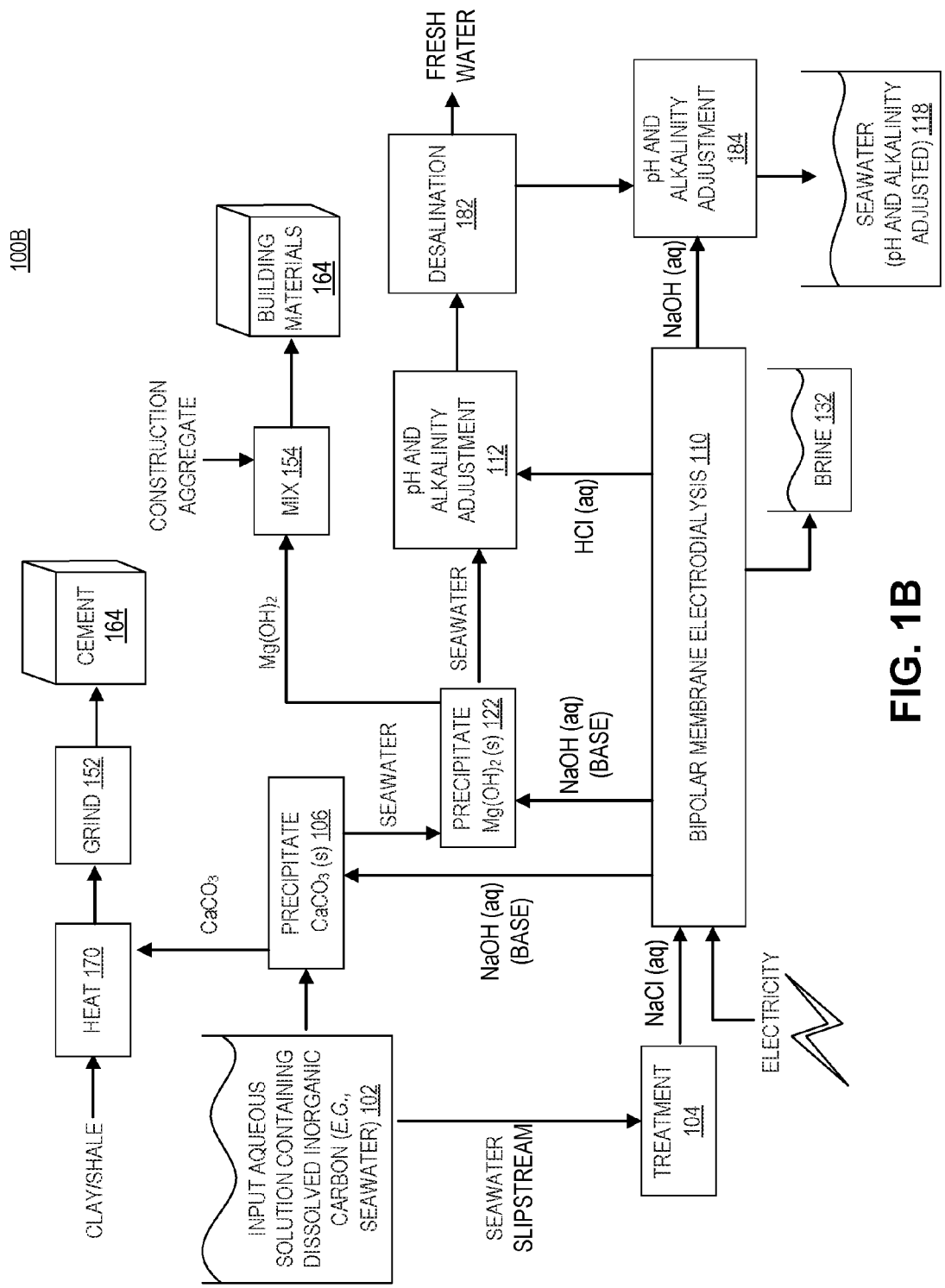
FIG. 1B is an illustration of a system for making building materials from an aqueous solution, in accordance with an embodiment of the disclosure.

FIG. 1B is an illustration of system 100B for making building materials from an aqueous solution, in accordance with an embodiment of the disclosure. System 100B is similar in many respects to system 100A of FIG. 1A. However, system 100B includes: second precipitation unit 122, desalination unit 182, second pH and alkalinity adjustment unit 184, heating unit 170, mixing unit 152, and cement output 164. However, one of ordinary skill in the art will appreciate that any portion of system 100A may be combined with system 100B or vice-versa.

As shown, calcium salts are precipitated in first precipitation unit 106 by increasing the pH of the aqueous solution with NaOH from electrodialysis unit 110. All or some of these calcium salts may be used to form limestone-based building materials. However, in the depicted embodiment, some of the calcium salts are transferred to a first salt processing unit (e.g., heating unit 107 and grinding unit 152) to receive the calcium salts and convert the calcium salts into other building materials—more specifically cement. In heating unit 170 the calcium salts are mixed with a first material (e.g., clay or shale) including silicon to form a mixture. The mixture is then heated to produce cement clinker.

In one embodiment, cement clinker is formed by pulverizing the mixture of limestone ($CaCO_3$) and clay—a silicon containing material—to make a "rawmix". The rawmix is then heated to a sintering temperature (e.g., 1450° C.). During heating of the rawmix, the following chemical process may occur: at 70-110° C. water is evaporated from the mixture, at 400-600° C. clay materials are decomposed into oxides such as $SiO_2$ and $Al_2O_3$, at 650-900° C. $SiO_2$ reacts with the $CaCO_3$ to form $Ca_2SiO_4$ (belite), at 900-1050° C. residual $CaCO_3$ decomposes to form carbon dioxide, which may be captured and sequestered if desired, and calcium oxide, and at 1300-1450° C. partial melting (and sintering) of the mixture takes place and the belite reacts with calcium oxide to form Ca3O.SiO4. Tricalcium silicate—also known as alite—is a major constituent of Portland cement. The partial melting or sintering process that occurs at roughly 1450° C. is needed to complete the reaction, and the mixture forms lumpy aggregate known as cement clinker. The hot clinker may be cooled and stored. Clinker in its raw form may be sold since clinker may last longer than finely crushed cement powder.

One skilled in the art will appreciate that other materials may be included in the mixture to make the cement clinker, for instance one of a second material including aluminum or a third material including iron may be added, depending on the desired properties of the cement. In some embodiments, gypsum may be added as well. Furthermore, the cement may fall within the composition guidelines for Portland cement: at least two-thirds by mass calcium silicates with the remainder including aluminum and iron-containing clinker phases along with other compounds.

A portion of system 100B is also designed to extract magnesium salts to create building materials. In the depicted embodiment, system 100B includes second precipitation unit 122 with a first input coupled to receive the aqueous solution (e.g., seawater) from first precipitation unit 106, and a second input coupled to electrodialysis unit 110 to receive aqueous NaOH. In response to receiving the aqueous solution and the aqueous NaOH, second precipitation unit 122 precipitates magnesium salts (for example, but not limited to, $Mg(OH)_2$) and outputs the aqueous solution. In other words, after precipitating the $CaCO_3$, the pH of the second portion of the aqueous solution is adjusted to a second pH threshold where $Mg(OH)_2$ precipitates (e.g., a pH of 10.4). Like first precipitation unit 106, second precipitation unit 122 can use any number of structures/techniques to speed up nucleation kinetics of $Mg(OH)_2$. For example, second precipitation unit 122 may include high surface area inserts, $Mg(OH)_2$ seed crystals, or may be heated/cooled to promote nucleation of $Mg(OH)_2$.

As depicted, second precipitation unit 122 is coupled to output the spent aqueous solution to pH and alkalinity adjustment unit 112. As stated above in connection with discussion of FIG. 1A, pH and alkalinity adjustment unit 112 may be coupled to electrodialysis unit 110 to receive NaOH or HCl. As shown the pH and alkalinity of wastewater may be adjusted to a safe pH for drinking or agricultural uses, or for curing cement. Accordingly, the depicted embodiment shows desalination unit 182 coupled to receive the pH adjusted wastewater. As its name implies, desalination unit 108 may remove NaCl from the wastewater to produce freshwater for any of the uses above or other uses not discussed.

In order to truly remove carbon from the oceans, second pH and alkalinity adjustment unit 184 may be coupled to desalination unit 182 to increase the pH and alkalinity of the wastewater output from desalination unit 182. Accordingly, the alkalinity of the water is changed to a value that enables sufficient reabsorption of atmospheric $CO_2$ once the water is returned to the ocean.

Extracted calcium and magnesium salts may be formed into blocks that can be placed in the ocean to form artificial reefs and breakwaters. In some low-lying islands, blocks of extracted Mg/Ca salts may be used to create land to combat rising sea levels. Ca/Mg salt blocks derived from seawater may be useful on coral-atolls where earth for landfill is already extremely scarce. These Mg/Ca salt blocks may be used in conjunction with concrete. For example concrete made from the processes described here may be used as mortar to hold together bricks of Mg/Ca salt. Similarly, concrete may be used to encase bricks of $CaCO_3$ so the bricks are not damaged by acid rain. System 100B may produce $CaCO_3$, $Mg(OH)_2$, and cement in any ratio to build useful structures.

Although not depicted in FIGS. 1A-1B, in other embodiments, heavy metals may be extracted from the aqueous solution along with $CaCO_3$ and $Mg(OH)_2$. Extraction of heavy metals may help remove harmful contaminants from the world's oceans.

Systems 100A-100B may be coupled to, and run by, electronic control systems. Regulation and monitoring may be accomplished by a number of sensors throughout the system that either send signals to a controller or are queried by controller. For example, with reference to electrodialysis unit 110, monitors may include one or more pH gauges to monitor a pH within the units as well as pressure sensors to monitor a pressure among the compartments in electrodialysis unit 110 (to avoid inadvertent mechanical damage to electrodialysis unit 110). Another monitor may be a pH gauge placed within first precipitation unit 106 to monitor a pH within the tank. The signals from such pH monitor or monitors allows a controller to control a flow of seawater (from input 102) and a basified solution (from electrodialysis unit 110) to maintain a pH value of a combined solution that will result in a precipitation of $CaCO_3$.

Alternatively, systems 100A-100B may be controlled manually. For example, a worker may open and close valves to control the various water, acid, and base flows in systems 100A-100B. Additionally, a worker may remove precipitated calcium salts from first precipitation unit 106. However, one skilled in the relevant art will appreciate that systems 100A-100B may be controlled by a combination of manual labor and mechanical automation, in accordance with the teachings of the present disclosure.

Figure 2:
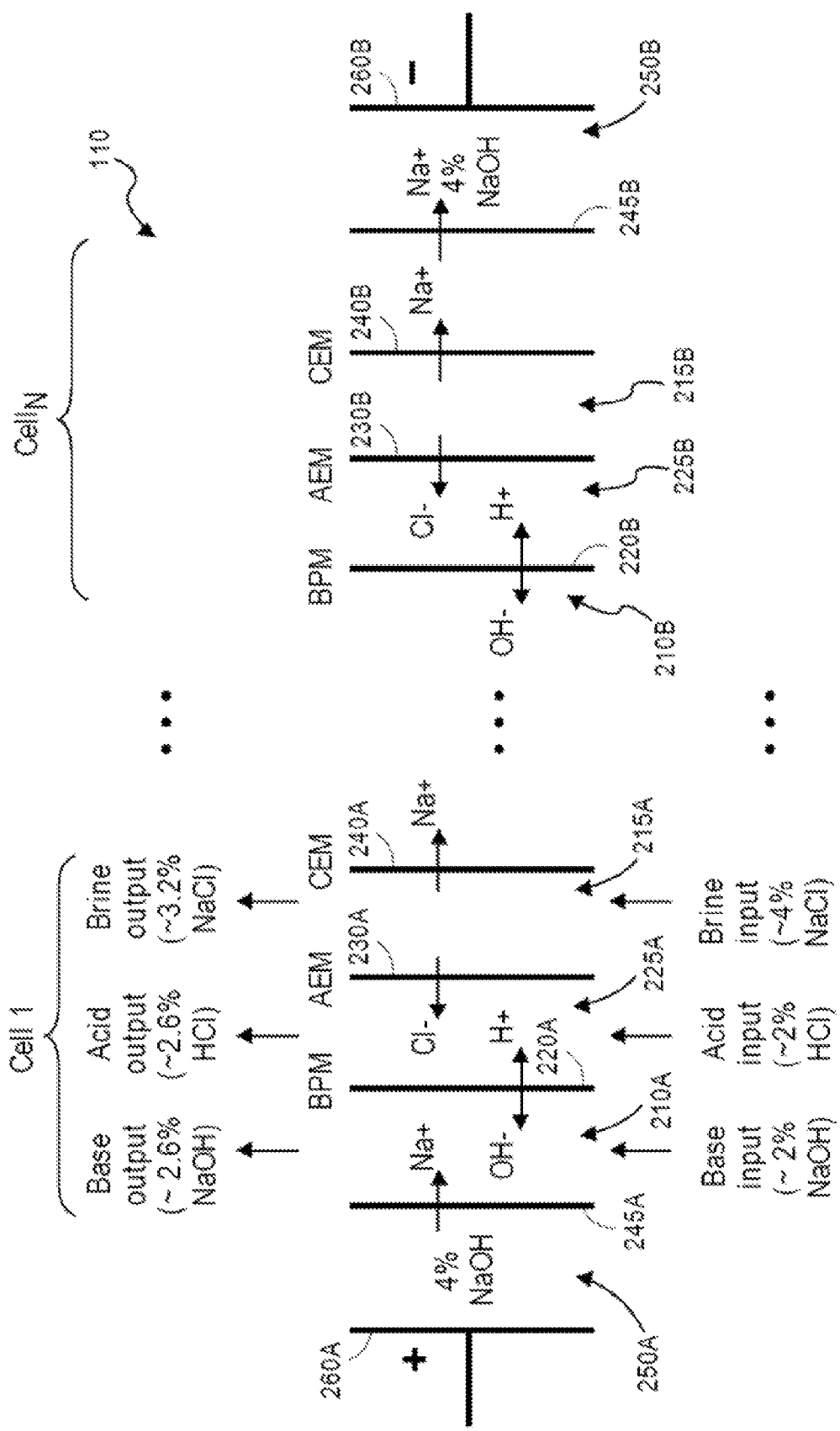
FIG. 2 is an example electrodialysis unit, in accordance with an embodiment of the disclosure.

FIG. 2 is an example electrodialysis unit 110 (e.g., electrodialysis unit 110 of FIG. 1), in accordance with an embodiment of the disclosure. Electrodialysis unit 110 may be used to convert seawater (or other NaCl-containing aqueous solutions) into NaOH and HCL. As shown, in FIGS. 1A-1B, NaOH and HCl may be used to adjust the pH of the aqueous solution to precipitate calcium and magnesium salts.

In the depicted embodiment, electrodialysis unit 110 representatively consists of several cells in series, with each cell including a basified solution compartment (compartments 210A and 210B illustrated); an acidified solution compartment (compartments 225A and 225B illustrated); and a brine solution compartment (compartments 215A and 215B). FIG. 2 also shows a bipolar membrane (BPM) between a basified solution compartment and an acidified solution compartment (BPM 220A and 220B illustrated). A suitable BPM is a Neosepta BP-1E, commercially available from Ameridia Corp. Also depicted are anion exchange membranes (AEM), such as Neosepta ACS (commercially available from Ameridia Corp.), disposed between a brine compartment and an acidified solution compartment (AEM 230A and 230B illustrated). A cation exchange membrane (CEM) such as Neosepta CMX-S (commercially available from Ameridia Corp.), is disposed adjacent to a brine compartment (CEM 240A and CEM 240B illustrated). Finally, FIG. 2 shows end cap membranes 245A and 245B (such as Nafion® membranes) that separate the membrane stack from electrode solution compartment 250A and electrode solution compartment 250B, respectively.

Broadly speaking, under an applied voltage provided to electrodialysis unit 110, water dissociation inside the BPM (and the ion-selective membranes comprising a BPM) will result in the transport of hydrogen ions (H+) from one side of the BPM, and hydroxyl ions (OH−) from the opposite side. AEMs/CEMs, as their names suggest, allow the transport of negatively/positively charged ions through the membrane. The properties of these membranes such as electrical resistance, burst strength, and thickness are provided by the manufacturer (e.g., Neosepta ACS and CMX-S are monovalent-anion and monovalent-cation permselective membranes, respectively). In one embodiment, electrodialysis unit 110 includes electrodes 260A and 260B of, for example, nickel manufactured by De Nora Tech Inc. FIG. 2 also shows electrode solution compartment 250A and electrode solution compartment 250B through which, in one embodiment, a NaOH(aq) solution is flowed. Where electrode 260A is a positively-charged electrode, sodium ions (Na+) will be encouraged to move across cap membrane 245A and where electrode 260B is negatively-charged, sodium ions will be attracted to electrode solution compartment 250B. In one embodiment, the solution compartments between adjacent membranes are filled with polyethylene mesh spacers (e.g., 762 μm thick polyethylene mesh spacers), and these compartments are sealed against leaks using axial pressure and 794 mm thick EPDM rubber gaskets.

One skilled in the art will appreciate that using electrodialysis unit 110 to produce the acids and bases necessary to create Ca/Mg salts is highly advantageous in environments with ample power but limited raw materials. For example, on a coral atoll electrodialysis unit 110 could be powered by solar panels, allowing people on the atoll to create building materials from nothing but renewable energy and seawater.

Figure 3:
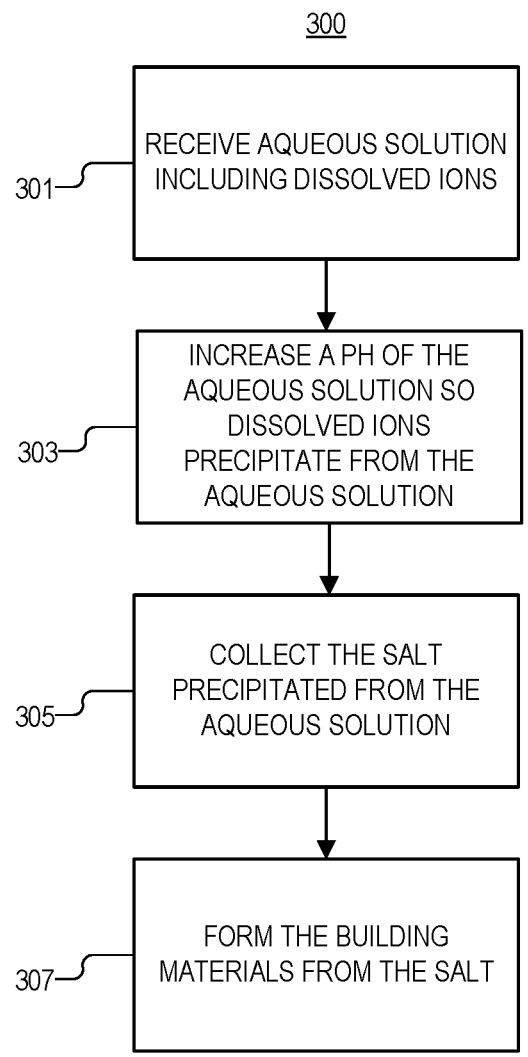
FIG. 3 is an illustration of a method for making building materials from an aqueous solution, in accordance with an embodiment of the disclosure.

FIG. 3 is an illustration of method 300 for making building materials from an aqueous solution, in accordance with an embodiment of the disclosure. The order in which some or all of process blocks 301-307 appear in method 300 should not be deemed limiting. Rather, one of ordinary skill in the art having the benefit of the present disclosure will understand that some of method 300 may be executed in a variety of orders not illustrated, or even in parallel. Additionally, method 300 may include additional blocks or have fewer blocks than shown, in accordance with the teachings of the present disclosure.

Block 301 shows receiving the aqueous solution including dissolved ions. In one embodiment, this may include receiving seawater containing dissolved calcium, carbon, and magnesium.

Block 303 discloses increasing a pH of the aqueous solution so the dissolved ions precipitate from the aqueous solution as salt. In one embodiment, this may involve mixing NaOH with the aqueous solution, while in other embodiments this may include mixing other basic chemicals with the aqueous solution to precipitate calcium or magnesium salts. The NaOH or other base may be supplied by electrodialysis equipment (see e.g., FIG. 2).

Block 305 illustrates collecting the salt precipitated from the aqueous solution. In one embodiment, salt includes at least one of calcium carbonate or magnesium hydroxide; however, in other embodiments other salts may be precipitated from solution depending on the pH of the solution and processing steps employed.

Block 307 discloses forming building materials from the salt. In one embodiment, construction aggregate and/or binder material (polymer, clays or the like) is added to the salt in order to form building materials such as bricks/blocks that may be useful for building terrestrial structures such as houses, or ocean structures such as breakwaters and harbors. The construction aggregate may include sand, gravel, crushed stone, or ash.

In another embodiment, forming the building materials includes adding a first material including silicon to the $CaCO_3$ and sintering the salt and the first material to form cement clinker. This cement clinker may subsequently be ground to form cement. Cement may be used stand-alone to build structures or in conjunction with calcium and magnesium salts.

Figure 4:
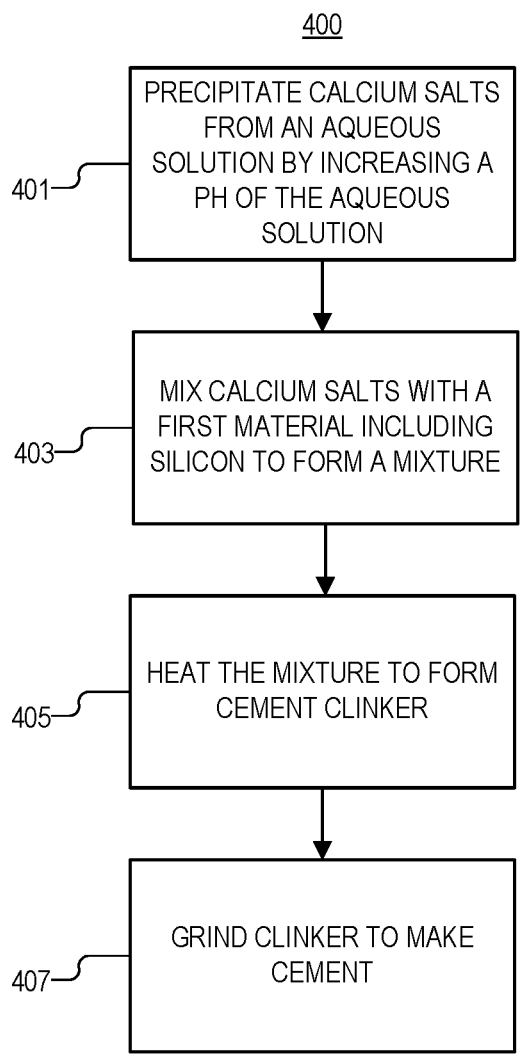
FIG. 4 is an illustration of a method for making building materials from an aqueous solution, in accordance with an embodiment of the disclosure.

FIG. 4 is an illustration of method 400 for making building materials from an aqueous solution, in accordance with an embodiment of the disclosure. The order in which some or all of process blocks 401-407 appear in method 400 should not be deemed limiting. Rather, one of ordinary skill in the art having the benefit of the present disclosure will understand that some of method 400 may be executed in a variety of orders not illustrated, or even in parallel. Additionally, method 400 may include additional blocks or have fewer blocks than shown, in accordance with the teachings of the present disclosure.

Block 401 shows precipitating calcium salts from an aqueous solution by increasing a pH of the aqueous solution. This may be accomplished by adding NaOH to the aqueous solution. The calcium salts may include calcium carbonate or the like.

Block 403 discloses mixing the calcium salts with a first material including silicon to form a mixture. This mixture may include other materials to alter the properties of the cement made from method 300. For instance, materials with iron and aluminum may be added along with gypsum. Other minerals/compounds not discussed may also be included in accordance with the teachings of the present disclosure.

Block 405 illustrates heating the mixture to form cement clinker. This may include heating the mixture to temperatures in excess of 1000° C. More specifically, the mixture may be heated to 1450° C. At these temperatures, the mixture is partially melted/sintered to form nodules of aggregate called clinker. Resultant clinker may be sold as-is since the shelf life of clinker is greater than that of the pulverized cement.

Block 407 discloses grinding the clinker to make cement. Once ground into a powder/dust the clinker will harden after application of water. Fresh water created through a desalinization process may be used to set/cure the cement and form structures in places where fresh water is not readily available. One skilled in the art will realize that the methods discussed here may be used to form calcium salts, magnesium salts, and cement in any quantity. Furthermore, the methods may produce a certain percentage of each material depending on the requirements of a particular construction project.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of making building materials from an aqueous solution, comprising:
   receiving the aqueous solution including dissolved ions with a first precipitation unit;
   increasing a pH of the aqueous solution in the first precipitation unit with aqueous NaOH received from an electrodialysis unit, coupled to the first precipitation unit to precipitate the dissolved ions from the aqueous solution as salt;
   collecting the salt precipitated from the aqueous solution; and
   forming the building materials from the salt.

2. The method of claim 1, wherein the salt includes at least one of calcium carbonate or magnesium hydroxide, and wherein the aqueous solution includes seawater.

3. The method of claim 1, further comprising adding construction aggregate to the salt prior to forming the building materials.

4. The method of claim 3, wherein the construction aggregate includes at least one of sand, gravel, crushed stone, or ash, and wherein forming the building materials includes compressing the salt and the construction aggregate.

5. The method of claim 1, wherein forming the building materials includes adding a first material including silicon and sintering the salt and the first material to form cement clinker.

6. The method of claim 1, wherein the building materials include at least one of cement, mortar, bricks, or road base.

7. The method of claim 1, wherein increasing the pH of the aqueous solution includes:
   receiving the aqueous solution with a brine solution compartment disposed in the electrodialysis unit;
   applying a voltage across electrodes in the electrodialysis unit, wherein the brine solution compartment is disposed between the electrodes;
   outputting the aqueous solution from the brine solution compartment with a lower salt concentration in response to the voltage applied across the electrodes;
   receiving the aqueous NaOH with a basified solution compartment disposed in the electrodialysis unit;
   applying the voltage across the electrodes in the electrodialysis unit; and
   outputting the aqueous NaOH from the basified solution compartment with a higher NaOH concentration in response to the voltage applied across the electrodes.

8. The method of claim 7, wherein increasing the pH of the aqueous solution includes:
   receiving aqueous HCl with an acidified solution compartment disposed in the electrodialysis unit;
   applying the voltage across the electrodes in the electrodialysis unit; and
   outputting the aqueous HCl, with a higher HCl concentration, from the acidified solution compartment, wherein chlorine ions in the brine solution compartment travel to the acidified solution compartment in response to the voltage cross the electrodes.

9. The method of claim 8, wherein in response to the voltage, the chlorine ions flow through an anion exchange membrane disposed between the brine solution compartment and the acidified solution compartment, and wherein in response to the voltage, hydrogen ions and hydroxyl ions flow through a bipolar membrane disposed between the acidified solution compartment and the basified solution compartment.

10. The method of claim 9, wherein applying the voltage across the electrodes in the electrodialysis unit includes collecting sodium ions at a negatively charged terminal, and wherein the brine solution compartment, the acidified solution compartment, and the basified solution compartment are included in a first cell in a plurality of cells in the electrodialysis unit.

11. The method of claim 10, further comprising neutralizing the aqueous solution, in a pH and alkalinity adjustment unit coupled to the electrodialysis unit, with the aqueous HCl, after precipitating the dissolved ions.

12. The method of claim 2, further comprising increasing the pH of the aqueous solution in a second precipitation unit with the aqueous NaOH received from the electrodialysis unit to precipitate the magnesium hydroxide, wherein the pH in the second precipitation unit is greater than the pH in the first precipitation unit.

13. The method of claim 12, wherein increasing the pH of the aqueous solution in the first precipitation unit includes precipitating the calcium carbonate.

14. The method of claim 13, further comprising receiving the aqueous solution with the second precipitation unit from the first precipitation unit which is coupled to the second precipitation unit.

15. The method of claim 12, wherein precipitating the magnesium hydroxide and precipitating the calcium carbonate includes adding inserts into the first precipitation unit and the second precipitation unit to increase the surface area of the first precipitation unit and the second precipitation unit.

* * * * *